Patented Feb. 9, 1943

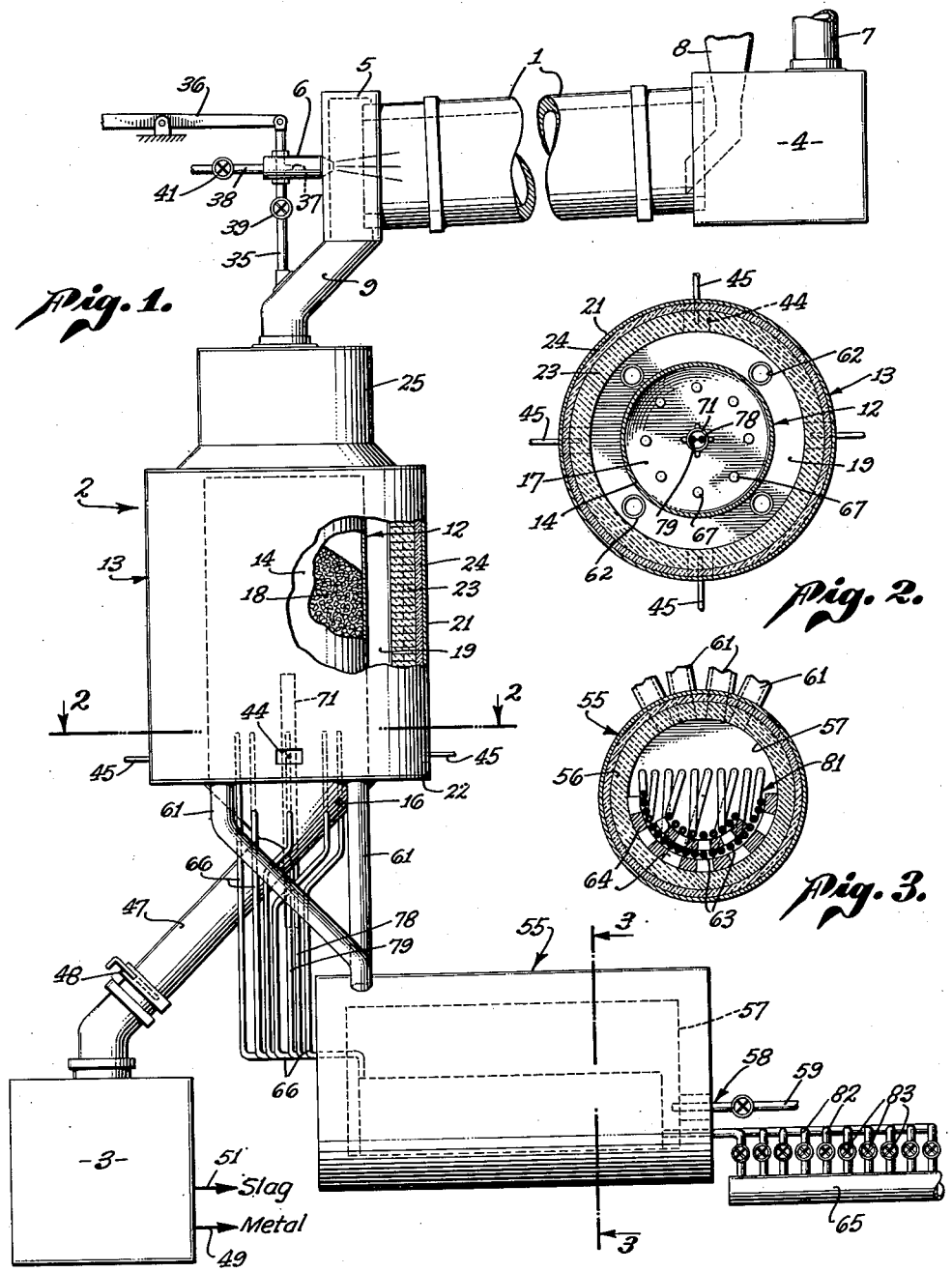

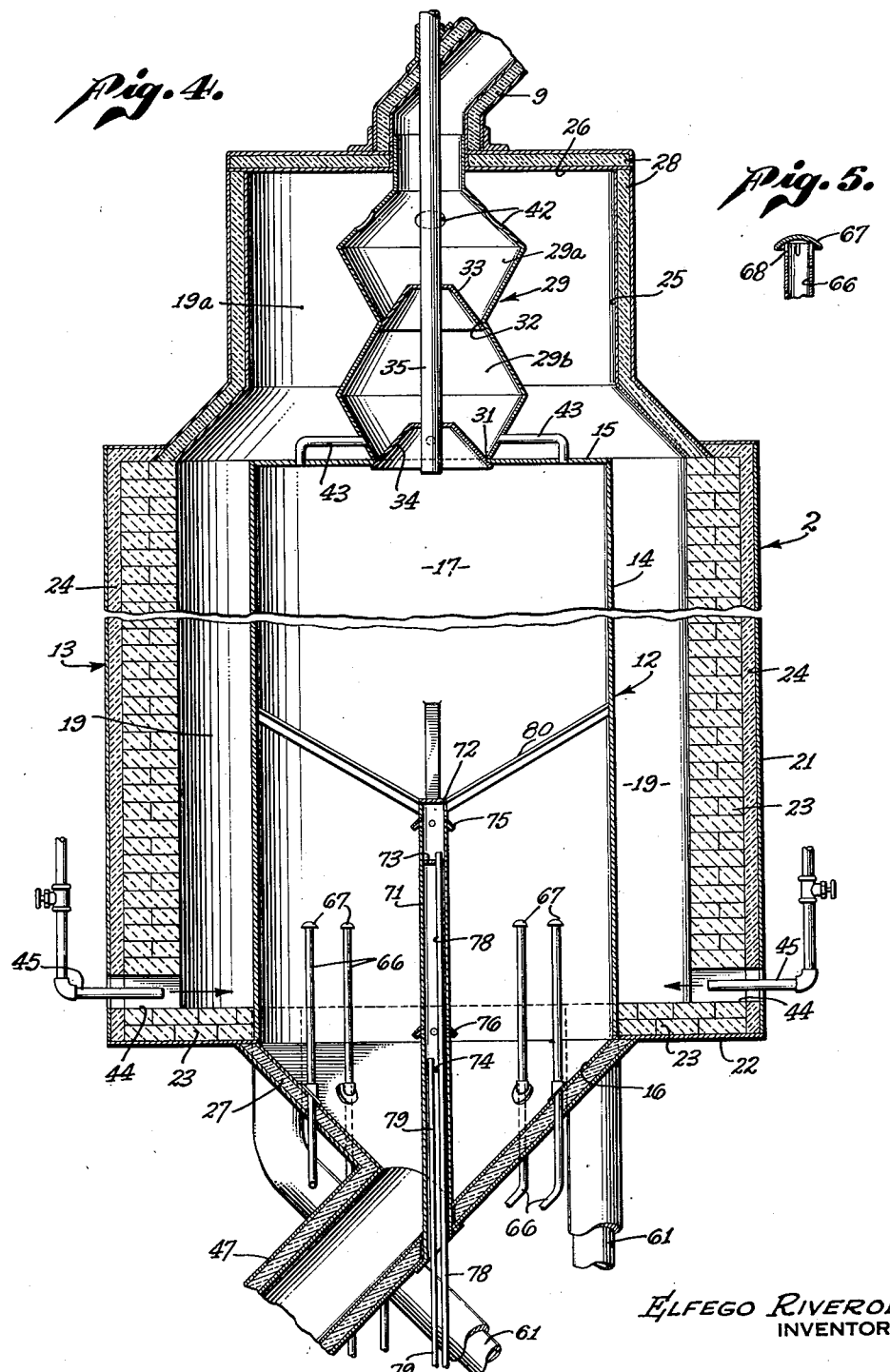

2,310,258

UNITED STATES PATENT OFFICE 2,310,258

PROCESS FOR RECOVERING MANGANESE FROM ORE

Elfego Riveroll, Hermosa Beach, Calif.

Application August 11, 1941, Serial No. 406,312

12 Claims. (Cl. 75—80)

This invention relates to the recovery of manganese from ores, and particularly to the reduction and recovery thereof from ores containing manganese in the form of one or more higher oxides thereof, that is, oxides in which the manganese is in a higher state of oxidation than manganous oxide, MnO.

The invention is adapted particularly for the recovery of manganese from ores containing pyrolusite ($MnO_2$), but may also be used advantageously for the recovery thereof from ores containing other minerals such as hausmannite ($Mn_3O_4$) or manganite ($Mn_2O_3.H_2O$), which are also included within the term "higher oxides of manganese," or minerals commonly referred to as "wad," which are impure mixtures containing higher oxides of manganese.

The principal object of the invention is to provide a process for recovery of manganese from such ores, in which a reducing gas is used as the principal reducing agent, and in which the treatment of the ore is conducted in a plurality of successive stages, the conditions in the several stages being maintained in such manner that the heating of the ore and the reduction of the manganese are accomplished efficiently and economically. In this connection, a particular object is to obtain a high degree of economy and freedom from operating difficulties by carrying out the successive stages in different types of furnaces or heating equipment, the characteristics of each furnace and the combined arrangement thereof being such that the furnace in each stage is particularly adapted to accomplish the treatment desired in that stage.

A further object of the invention is to provide for the reduction of the manganese, by a process which does not require any solid reducing agent to be introduced as such into the process, although, as will be explained, some solid reducing agent may be used if desired, in the last stage of the process.

A further object of the invention is to provide an improved method for effecting reduction of manganese from its original state of oxidation in the ore to a state of oxidation lower than manganosic oxide ($Mn_3O_4$) by contact at a suitably elevated temperature with a hydrocarbon gas as a reducing agent.

In accordance with the present invention the above objects, and other objects of the invention which will become apparent or will be pointed out hereinafter, are accomplished by means of a process in which the ore is subjected to at least three successive and separate stages, as described below.

In the first stage, the ore in a suitable crushed or divided condition is heated by direct contact with a gaseous heating medium to a temperature sufficient to remove all water present in the ore, and preferably substantially to the temperature at which the reduction is to be carried out in the second stage. In addition to the drying and preheating of the ore, an important function of this first stage is to cause at least the major portion of the expansion of the ore particles, due to heating thereof to the temperature required for subsequent reduction, to take place in this stage. This preheating stage is therefore preferably conducted in a furnace of the rotary kiln type in which the ore is brought into direct and intimate contact with the hot gases and is at all times free to expand. This preheating also serves, in the case of most ores, to produce a partial fracturing, splitting, or cracking of the ore particles (without causing the particles to actually break apart to any considerable extent), which promotes effective contact of the reducing gas in the next stage with all portions of the ore. The rotary furnace is preferably heated at least in part by combustion of gases leaving the reducing chamber of the second stage and by residual heat of the combustion gases from the heating chamber of the second stage, as described hereinafter, and additional gas or other fuel may be supplied and burned in sufficient amount to maintain the desired temperature.

In the second stage, the ore is subjected to contact in an enclosed reducing chamber with a preheated reducing gas at a temperature sufficient to cause reduction of the oxide of manganese to a state of oxidation lower than $Mn_3O_4$. The reducing chamber is adapted to be tightly enclosed so as to exclude atmospheric air therefrom, and is preferably maintained under a pressure above atmospheric pressure. This reducing operation is preferably carried out in an externally heated vertical shaft furnace or retort, in which a vertically extending body of ore is maintained, and through which the reducing gas is passed. In the preferred embodiment of the invention, the reducing gas is introduced into the lower portion of the ore body, and preferably at a plurality of positions intermediate the height of the externally heated reducing zone.

The reducing gas used is a hydrocarbon gas, such as natural gas which usually consists principally of methane, with some ethane or other higher hydrocarbons, and such gas is preferably preheated, externally of the reducing chamber, to a temperature at least approximating, and preferably somewhat above, the temperature of the ore in the reducing chamber. The hydrocarbon gas is at least partly decomposed upon contact with the ore at the existing temperature, resulting in the formation of gaseous products including hydrogen, and of solid carbon. The manganese is caused to be partially reduced by reaction of the higher oxide or oxides thereof with the hydrogen and carbon, and possibly also by direct reaction with hydrocarbon gases, resulting in the formation of MnO or other oxide lower than $Mn_3O_4$, and some metallic manganese. These reactions also result in the formation of gaseous products including carbon monoxide and water vapor. These gaseous products are removed from the reducing chamber. The gases so removed contain carbon monoxide, and may also contain other combustible gases such as hydrogen or hydrocarbons, and I therefore prefer to burn these gases to provide part of the hot combustion gases employed in the first stage.

The conditions in the second stage, including temperature, time of contact, and the manner and rate of introduction of reducing gas, are such that part of the oxide of manganese is reduced to the metallic state and the remainder is reduced to an oxide lower than $Mn_3O_4$, and some carbon formed by decomposition of the hydrocarbon gas ordinarily remains in the ore. The ore is discharged from this stage in the form of particles containing the manganese entirely in a condition less oxidized than $Mn_3O_4$, and also containing carbon either in free finely divided condition or combined with metallic manganese.

The ore is then subjected, in the third stage, to further heating, in the presence of sufficient carbon or other solid reducing agent and at sufficiently high temperature to complete the reduction of the manganese to the metallic state and to cause fusion of the resulting manganese metal and the formation of a slag containing the gangue constituents of the ore. This final reducing and smelting operation is carried out in an enclosed chamber in which a reducing atmosphere is maintained and from which air is excluded, and is preferably conducted in an electric furnace of either the arc or induction type. In some cases, the partially reduced ore discharged from the second stage may contain sufficient carbon to complete the reduction of the manganese in the third stage, but I have found that it is generally necessary to add some additional coke or other form of carbon to the charge in the third stage. It will, of course, be understood that any desired fluxing agents such as are commonly used in smelting may be added to promote fusion of the gangue constituents and separation of the resulting molten slag from the molten metal.

The process may be better described in greater completeness and detail by reference to the accompanying drawings, which illustrate apparatus for use therein, and in which:

Fig. 1 is a somewhat diagrammatic side elevation of the complete apparatus for carrying out the three-stage process;

Fig. 2 is a horizontal section taken on line 2—2 in Fig. 1;

Fig. 3 is a vertical section on line 3—3 in Fig. 1;

Fig. 4 is a vertical section, on a larger scale, of the reducing furnace for the second stage of the process; and Fig. 5 is a vertical sectional view of one of the pipes or nozzles through which the reducing gas is introduced into the body of ore in the reducing zone.

The apparatus for carrying out the above described three-stage process is shown as comprising a rotary kiln 1, an externally heating reducing furnace 2, and an electric furnace 3.

The rotary kiln is inclined downward from right to left and may be provided with any suitable conventional means not shown for rotating the kiln about its longitudinal axis. The upper and lower ends of the kiln extend into and communicate with housings 4 and 5, and the kiln is provided at its lower end with burner means 6 for directing hot combustion gases into the kiln through the housing 5, and at its upper end with a stack 7 for discharge of waste gases and with means such as feed spout 8 for supplying ore in crushed or suitably divided condition into the upper end of the kiln. At the lower end of the kiln the ore is discharged therefrom into an inclined chute 9 for delivering ore from the kiln into the upper end of the reducing chamber of reducing furnace 2.

The reducing furnace 2 comprises an inner housing 12 and an outer housing 13. The inner housing includes a side wall 14 formed as a vertically extending cylindrical shell, a top wall 15, and a conical bottom wall 16, defining therewithin a completely enclosed vertically extending reducing chamber 17, in which a vertically extending body of ore is continually maintained during operation of the process as indicated at 18 in Fig. 1. Chamber 17 is provided with means hereinafter described for excluding atmospheric air therefrom and for admitting reducing gas thereto under suitable pressure, and is preferably provided with means for maintaining a pressure in the reducing chamber greater than atmospheric pressure.

The outer housing is also cylindrical in shape and extends throughout the major portion of the height of the inner housing, to define an annular heating chamber 19 surrounding the reducing chamber throughout the major portion of its height. The outer housing is shown as comprising a cylindrical shell 21 and a bottom wall 22, constructed of steel or other suitable metal, lined with refractory brick as indicated at 23 and preferably also provided with a layer of heat-insulating material indicated at 24. Adjacent the lower end of the outer housing are four burner openings 44 spaced 90° apart, in which are mounted burner means such as nozzles 45 for supplying combustible gas or other fuel. The outer housing also includes an upper portion 25 of reduced diameter extending above the upper end of the inner housing 12 and closed at its upper end by a top wall 26. The conical bottom wall 16 and the walls 25 and 26 of the upper portion of the furnace are shown as being of double-walled construction with heat-insulating material therebetween as indicated at 27 and 28.

The inner housing 12 is provided at its upper end with hopper means 29 for conducting ore from chute 9 into the reducing chamber 17, and suitable means are provided for controlling the movement of ore through said hopper means. Said control means is preferably arranged to provide for intermittent charging of ore into the reducing chamber, and may, for example, be comparable to the double bell or cone arrangement commonly used for controlling the supply of materials into a blast furnace. In the form of apparatus shown in Fig. 4, the hopper 29 has an upper hopper compartment 29a communicating with the lower end of chute 9 and a lower hopper compartment 29b communicating with chamber 17 through a central opening 31 in the top wall 15 of the inner housing, the upper and lower compartments communicating with each other through an opening 32. Hopper 29 is located centrally within the upper portion 25 of the furnace housing, and the surrounding space 19a constitutes an upward extension of the heating chamber 19, for heating material within the hopper. Conical valves or gates 33 and 34 are disposed adjacent openings 32 and 31, respectively, and these cones are shown as mounted on a centrally located vertical pipe 35 which is in turn supported at its upper end by an operating lever 36, whereby both cones may be raised to closed position, as shown, and may be lowered to positions removed from the hopper openings to permit downward movement of ore. Pipe 35 also serves to conduct gases from the upper end of the reducing chamber to the burner means 6. Said pipe is open at its lower end, in communication with chamber 17. It extends slidably through burner means 6 and is provided with a nozzle or opening 37 within the burner for delivering gas thereto, and is closed at its upper end.

Additional combustible gas or other fuel may be supplied to burner means 6 through pipe 38. Pipes 35 and 38 are shown provided with valves 39 and 41 for controlling flow therethrough.

Means are provided for conducting hot combustion gases from the heating chamber of reducing furnace 2 into the rotary kiln 1, and such means is shown as comprising the upper hopper compartment 29a and chute 9, said compartment communicating with space 19a through a plurality of openings 42 in the wall of hopper 29. Pipes 43 are also shown leading from the top of the reducing chamber 17 into lower hopper compartment 29b for admitting gases from said chamber into said compartment, as described hereinafter.

An inclined conduit or chute 47 leads from the bottom of the reducing chamber, for conducting treated ore therefrom and charging it into the electric furnace 3, and said conduit is provided with a gate valve 48 or other suitable means for normally retaining the ore in the reducing chamber and intermittently charging the electric furnace. The electric furnace may be an arc furnace or induction furnace of conventional type, adapted to exclude air from the interior thereof and to heat the partially reduced ore therein to a sufficiently high temperature for completing the reduction and for smelting the metallic manganese, and is provided with means, not shown, for discharge of molten metal and slag as indicated diagrammatically at 49 and 51, the actual construction and arrangement of such discharge means being dependent upon the particular type of furnace employed.

The apparatus is also provided with means located outside the reducing chamber 17 for preheating reducing gas and with means for introducing the preheated gas into the lower portion of the reducing chamber, preferably at a plurality of positions intermediate the height of the zone surrounded by the heating chamber 19, i. e., the zone in which heat is supplied to ore in the reducing chamber through the wall of the inner housing 14.

The reducing gas heater is indicated at 55 and is shown as comprising a cylindrical furnace housing provided with a refractory lining 56 defining a combustion chamber 57 through which the conduits supplying the reducing gas extend. The furnace is provided with burner means 58 to which combustible gas or other fuel is supplied through line 59 and burned within the combustion chamber. The resulting hot combustion gases, after giving up part of their heat in heating the reducing gas, are conducted through a plurality of conduits 61 into the lower end of the heating chamber 19. The conduits 61 are shown as communicating with the heating chamber at a plurality of different positions around the reducing chamber as indicated at 62 in Fig. 2.

The means for heating the reducing gas may further comprise a plurality of heating coils disposed within the combustion chamber 57 as indicated at 63 and mounted on suitable refractory supporting means 64. The reducing gas is preferably supplied through a plurality of separate conduits connected to a reducing gas supply line 65, each extending through the combustion chamber 57 and including a separate heating coil 63 therein, and leading therefrom to the different positions at which the reducing gas is to be introduced into the reducing chamber.

In the particular arrangement shown, eight pipes or conduits 66 extend up through the bottom of the reducing furnace 2 and open into the reducing chamber at their upper ends at positions between the axis and periphery of the chamber and equally spaced about the axis thereof. As illustrated particularly in Fig. 5, each of the pipes 66 is provided with a cap 67 extending over the upper end thereof and with a plurality of openings 68 below said cap, in order to prevent the ore particles from entering the pipe while permitting outflow of reducing gas into the surrounding ore body. Referring to Fig. 4, it will be seen that each of the pipes 66 thus communicates with the interior of the reducing chamber at the lower portion of said chamber and at a level somewhat above the bottom of the heating chamber 19.

I have also shown additional means for supplying preheated reducing gas at other positions near the center of the reducing chamber and in the lower portion thereof. For this purpose, a centrally located pipe 71 extends up from the bottom of the conical bottom wall 16 to a position somewhat above the bottom of the heating chamber 19 and preferably above the upper ends of pipes 66. This pipe 71 is closed at its upper end as indicated at 72 and is provided with an upper partition member 73 spaced below the closed upper end and a lower partition member 74 spaced below the partition 73, and with two sets of nozzles or orifice members 75 and 76 located at different levels and communicating respectively with the portions of pipe 71 above partition 73 and between partitions 73 and 74. I have shown four such nozzle members in each set, spaced 90° apart around the pipe, and these members preferably extend downwardly and outwardly so as to discharge the reducing gas into the ore body in a downwardly inclined direction and prevent the ore particles from entering the nozzles. Pipes 78 and 79 extend up within the pipe 71, the pipe 78 communicating with the space above partition 73 for delivering gas to the upper set of nozzles 75, and the pipe 79 communicating with the space between partitions 73 and 74 for delivering gas to the lower set of nozzles 76. The upper end of pipe 71 may be supported by bars 80 secured to the side wall 14.

The above described pipes 66, 78, and 79 enter the heating furnace 55 through the rear wall thereof and are connected as indicated at 81 in Fig. 3 to the respective separate heating coils 63, the other ends of said coils being connected to the reducing gas supply line through pipes 82 which extend through the forward wall of the heating furnace 55 and are provided with valves 83 for regulating the flow of gas therethrough.

Although no ore is shown within the reducing chamber 17 in Fig. 4, it will be understood that during normal operation a body of ore is continually maintained within said chamber up to a level above the various positions of introduction of reducing gas, for example, to some such level as indicated in Fig. 1, the gate valve 48 being normally closed to retain such ore body within the reducing chamber and to complete the gas-tight enclosure of the reducing chamber.

In carrying out the process in the above described apparatus, the ore is first crushed or otherwise reduced to a suitable divided condition, for example, about ½ to ¾ inch, and is passed through the rotary kiln 1 and heated therein by direct contact with hot combustion gases from burner means 6 and also by hot gases coming from the heating chamber of the reducing furnace. The temperature in the kiln, and the rate of movement of the ore therethrough, are so regulated as to heat the ore to a temperature sufficient to thoroughly dry it, and preferably to a temperature substantially equal to or closely approximating the temperature that it is desired to maintain in the reducing chamber in the second stage. This temperature should be between about 400° C. and about 900° C., and preferably between about 650° C. and about 800° C.

The ore within the rotary kiln is at all times free to expand upon heating thereof, and this preheating of the ore in this manner serves to prevent the ore from undergoing any substantial further expansion within the body of ore held in the reducing chamber in the next step. By thus causing the thermal expansion of the ore particles to take place in the first stage, I eliminate the possibility of the ore becoming tightly jammed or wedged in the reducing chamber, as would frequently occur if it were attempted to heat the ore, from a materially lower temperature to the temperature required for reduction, within the stationary body of ore in the reducing chamber in which the ore particles are not free to expand without tending to become jammed due to the forces resulting from expansion.

The heating of the ore to the above-mentioned temperature and the resulting expansion, in the first stage, also produces fracturing, splitting, or cracking of the ore particles (without appreciable disintegration or breaking up of the particles), and the resulting cracks or fissures serve to promote effective contact of the reducing gas with the material within the particles, in the second stage.

The rotary kiln is preferably operated continually, and the heated ore is discharged from the lower end of the kiln, through enclosed chute 9, into the upper hopper 29a of the reducing furnace 2. At suitable intervals additional quantities of this heated material are introduced into the reducing chamber 17. When cones 33 nd 34 are lowered, material is discharged from the upper hopper into the lower hopper 29b, and material from the lower hopper is discharged into the reducing chamber. The ore within the hopper compartments is kept heated, at substantially constant temperature, by hot combustion gases passing through the chamber 19a and through the upper hopper compartment.

As already described, a vertically extending body of ore 18 is continually maintained within reducing chamber 17, and heat is supplied thereto indirectly through the walls of the inner housing 12, from the hot combustion gases in heating chamber 19. By means of hot gases delivered to chamber 19 through conduits 61 and by combustion of combustible gases or other fuel at the burners 45, I maintain within heating chamber 19 a temperature somewhat greater (preferably about 100° to 150° C. higher) than the desired temperature of the ore body 18.

Natural gas or other hydrocarbon gas is continually introduced into the body of ore within the reducing chamber as above described, through pipes 66, 78, and 79, and thence through openings 68 and nozzles 75 and 76. Such gas is delivered from supply line 65 at suitable pressure, and is preheated in passing through coils 63, to a temperature at least approximating, and preferably somewhat above (for example, about 100° to 150° C. above) the temperature of the ore body 18.

For best results, the ore within the reducing chamber is kept at a temperature between about 650° and 800° C., although in some cases satisfactory results are obtained at temperatures as low as about 400° C. or as high as about 900° C.

The preheated gas is brought into intimate contact with the ore, and reacts with the higher oxide or oxides of manganese, to reduce the manganese to a state of oxidation lower than manganosic oxide, $Mn_3O_4$, resulting in formation of manganous oxide, MnO (or of some other lower oxide), and some metallic manganese. During the reactions, hydrogen and carbon are formed by decomposition of the hydrocarbon gas, and the actual reduction may be due, at least principally, to reaction of such hydrogen and carbon with the higher oxides of manganese, resulting in the formation of manganous oxide and metallic manganese, and of water vapor and carbon monoxide as gaseous reaction products. I have not determined the exact nature and extent of the various reactions, but the following are illustrative of probable reactions:

$$CH_4 = C + 2H_2$$
$$H_2 + MnO_2 = MnO + H_2O$$
$$C + MnO_2 = MnO + CO$$
$$C + H_2O = H_2 + CO$$
$$H_2 + MnO = Mn + H_2O$$
$$C + MnO = Mn + CO$$

Although some of the carbon formed by decomposition of the hydrocarbon is consumed in the reduction of the manganese, a portion of the carbon deposits upon and throughout the ore particles and remains intimately and uniformly dispersed therein, either in the form of free carbon or chemically combined with the metallic manganese.

The ore delivered to the top of the ore body is moved downwardly by gravity, as treated ore is periodically withdrawn from the bottom of the reducing chamber, and the reduction thus proceeds progressively as the ore descends. As explained above, the conditions are so regulated that, by the time the ore reaches the bottom of the chamber, the manganese is completely reduced to a state of oxidation lower than $Mn_3O_4$, and partially to metallic manganese, and the ore particles also contain some carbon deposited therein as described above.

The gaseous reaction products are discharged from the upper end of the reducing chamber and are delivered through pipe 35 to burner means 6 for combustion of combustible constituents thereof, such as carbon monoxide, hydrogen, or hydrocarbons. Pipes 43 are provided for conducting some of the gases from the reducing chamber into the lower hopper compartment 29b, particularly when the cone 33 is moved to open position, and some reduction is thus accomplished by contact of these gases with the heated ore in said compartment.

During normal operation the valve members 33, 34, and 48 are kept closed, except when transferring material from one stage to the next, and serve to exclude air from the reducing chamber. Valves 83 and valve 39 are adjusted to regulate the rate of flow of reducing gas into the reducing chamber and the rate of outflow of gaseous products therefrom, and valve 39 may be adjusted to maintain the reducing chamber under a pressure greater than atmospheric pressure. I prefer to maintain a gauge pressure of about 2 lbs./sq. in. or more in the reducing chamber, and gauge pressures as high as 10 or 15 lbs./sq. in. or more are desirable in some cases.

The separate supply conduits 66, 78, and 79 are connected to the main supply line 65 through separate heating coils 63 and separate pipes 82, and the valves 83 in the respective pipes 82 may be adjusted to separately control the rate of introduction of reducing gas at the several positions in the reducing chamber, so as to maintain either uniform or different rates of introduction of reducing gas at such positions. In general, I prefer to maintain substantially equal rates of introduction of gas at the several positions.

It will be understood that suitable indicating or recording instruments may be provided at suitable positions in the system, for indicating or recording the temperature, pressure, rate of gas flow, or other operating conditions which are to be controlled.

At suitable intervals, gate valve 48 is opened, to discharge treated ore in partially reduced condition from the reducing chamber to the electric furnace 3, in sufficient quantity to charge said furnace. In this final stage of the process, the ore is heated in the presence of sufficient carbon or other solid reducing agent to complete the reduction of the manganese to metallic state, and to a sufficient temperature to complete such reduction and fuse the metallic manganese, the gangue constituents being also fused to form a slag. The temperature usually required in this stage is between about 1,500° C. and 1,650° C.

In some cases, the amount of carbon contained in the ore discharged from the reducing chamber is sufficient to complete the reduction in the electric furnace. However, I prefer in general to operate the second stage under such conditions that the amount of carbon contained in such discharged ore is less than sufficient for this purpose, and to add the required amount of additional carbon to the charge in the electric furnace, preferably in the form of crushed or powdered coke.

It is usually necessary or desirable to add a fluxing agent, such as lime or some other material commonly used for this purpose, to promote fusion of gangue constituents in the electric furnace and the formation of a slag that separates readily and completely from the molten metallic manganese, and any such fluxing agent is preferably added to the ore delivered to the first stage of the process so as to be dried and heated along with the ore in the first and second stages.

When the reduction and smelting is completed, the slag and molten metal are separately withdrawn from the electric furnace, and the manganese may be solidified in the form of bars or ingots, in well-known manner.

Iron or any other desired alloying constituents may be added to the charge in the electric furnace, to be fused therein and produce an alloy of desired composition. For example, I may add scrap iron in a proportion calculated for the production of ferro-manganese of desired composition.

Although I have shown only a single furnace in each stage of the process, it will be understood that two or more furnaces may be employed, in parallel relation, in each stage. As an example, I may provide two or any desired number of electric furnaces whose combined rate of capacity is equal to the capacity of a single rotary kiln and a single reducing, and successive batches of partially reduced ore may be delivered from the reducing furnace to the respective electric furnaces, so that the rotary kiln and reducing furnace may be operated continually at maximum capacity.

The following tabulated data indicates the condition and results of one particular run, under the preferred conditions as established for a certain type of ore:

Ore treated—pyrolusite ore, containing 24.3% manganese (present as $MnO_2$ in the ore).

Flux added in first stage—15 lbs. lime rock per 100 lbs. of ore.

Temperature of ore leaving 1st stage—760° C.

Temperature of ore in 2nd stage—760° C.

Reducing gas (natural gas, containing approximately 70% $CH_4$ and 20% $C_2H_6$) 8,000 cu. ft. used per ton of charge.

Temperature of preheated reducing gas—870° C.

Partially reduced ore from 2nd stage contains 32.4% manganese (about 4–5% metallic manganese (about 4–5% metallic manganese, remainder oxide lower than $Mn_3O_4$) and 0.36% carbon.

Carbon added in 3rd stage—5 lbs. coke (17% ash) per 100 lbs. of ore.

Metallic iron added in 3rd stage—4 lbs. per 100 lbs. of ore.

Composition of final product:

|  | Per cent |
|---|---|
| Mn | 68 |
| Fe | 18 |
| Si | 13 |
| C | 1 |

The apparatus described herein is described and claimed in my application Serial No. 433,861, filed March 9, 1942, for "Apparatus for recovering metal from ore."

I claim:

1. A process for the recovery of manganese from an ore containing an oxide thereof higher than MnO, which comprises: passing the ore in divided condition in contact with hot combustion gases in a first stage in which the ore is free to expand on heating, to remove water present in the ore and heat the ore to a temperature between about 400° C. and about 900° C.; delivering the dried and heated ore from the first stage into an enclosed vertically extending chamber and maintaining a vertically extending body of such ore within said chamber for treatment in a second stage; supplying heat to said ore body through the walls of said chamber in a heated zone extending throughout a major portion of the height of said ore body, to maintain said ore body at a temperature between about 400° C. and 900° C. within said zone; introducing a preheated hydrocarbon gas into contact with the ore in said body at a plurality of positions intermediate the height of said heated zone, to cause reduction of manganese in said ore within the body to a state of oxidation lower than $Mn_3O_4$ and partially to metallic manganese; removing from the lower end of the ore body partially reduced ore containing manganese completely reduced to a state of oxidation lower than $Mn_3O_4$ and partially reduced to metallic state; subjecting the ore so removed, in a third stage, to further heating in the presence of a solid reducing agent at a temperature sufficient to complete the reduction of the manganese to the metallic state and cause fusion thereof; and recovering the resulting metallic manganese.

2. A process for the recovery of manganese from an ore containing an oxide thereof higher than MnO, which comprises: passing the ore in divided condition in contact with hot combustion gases in a first stage in which the ore is free to expand on heating, to remove water present in the ore and heat the ore to a temperature between about 650° C. and about 800° C; delivering the dried and heated ore from the first stage into an enclosed vertically extending chamber and maintaining a vertically extending body of such ore within said chamber for treatment in a second stage; supplying heat to said ore body through the walls of said chamber, to maintain said ore body at a temperature between about 650° C. and 800° C; introducing a preheated hydrocarbon gas into contact with the ore in the lower portion of said body, to cause reduction of manganese in said ore within the body to a state of oxidation lower than $Mn_3O_4$ and partially to metallic manganese; removing from the lower end of the ore body partially reduced ore containing manganese completely reduced to a state of oxidation lower than $Mn_3O_4$ and partially reduced to metallic state; subjecting the ore so removed, in a third stage, to further heating in the presence of a solid reducing agent at a temperature sufficient to complete the reduction of the manganese to the metallic state and cause fusion thereof; and recovering the resulting metallic manganese.

3. A process for the recovery of manganese from an ore containing an oxide thereof higher than MnO, which comprises: passing the ore in divided condition in contact with hot combustion gases in a first stage in which the ore is free to expand on heating, to remove water present in the ore and heat the ore to a temperature between about 400° C. and about 900° C.; delivering the dried and heated ore from the first stage into an enclosed vertically extending chamber and maintaining a vertically extending body of such ore within said chamber for treatment in a second stage; supplying heat to said ore body through the walls of said chamber, to maintain said ore body at a temperature between about 400° C. and 900° C.; introducing a preheated hydrocarbon gas into contact with the ore in the lower portion of said body, to cause reduction of manganese in said ore within the body to a state of oxidation lower than $Mn_3O_4$ and partially to metallic manganese; removing from the lower end of the ore body partially reduced ore containing manganese completely reduced to a state of oxidation lower than $Mn_3O_4$ and partially reduced to metallic state; subjecting the ore so removed, in a third stage, to further heating in the presence of a solid reducing agent at a temperature sufficient to complete the reduction of the manganese to the metallic state and cause fusion thereof; and recovering the resulting metallic manganese.

4. A process for the recovery of manganese from an ore containing an oxide thereof higher than MnO, which comprises: passing the ore in divided condition in contact with hot combustion gases in a first stage in which the ore is free to expand on heating to remove water present in the ore and heat the ore to a temperature between about 400° C. and about 900° C.; delivering the dried and heated ore from the first stage into an enclosed vertically extending chamber and maintaining a vertically extending body of such ore within said chamber for treatment in a second stage; supplying heat to said ore body through the walls of said chamber in a heated zone extending throughout a major portion of the height of said ore body, to maintain said ore body at a temperature between about 400° C. and 900° C. within said zone; introducing a preheated hydrocarbon gas into contact with the ore in said body at a plurality of positions intermediate the height of said heated zone, to cause reduction of manganese in said ore within the body to a state of oxidation lower than $Mn_3O_4$ and partially to metallic manganese, and to cause deposition on the ore of carbon formed by decomposition of the hydrocarbon gas; removing from the lower end of the ore body partially reduced ore containing manganese completely reduced to a state of oxidation lower than $Mn_3O_4$ and partially reduced to metallic state and also containing carbon; subjecting the ore so removed, in a third stage, to further heating in the presence of a solid reducing agent including the carbon present in the ore, at a temperature sufficient to complete the reduction of the manganese to the metallic state and cause fusion thereof; and recovering the resulting metallic manganese.

5. A process for the recovery of manganese from an ore containing an oxide thereof higher than MnO, which comprises: passing the ore in divided condition in contact with hot combustion gases in a first stage in which the ore is free to expand on heating to remove water present in the ore and heat the ore to a temperature between about 650° C. and about 800° C.; delivering the dried and heated ore from the first stage into an enclosed vertically extending chamber and maintaining a vertically extending body of such ore within said chamber for treatment in a second stage; supplying heat to said ore body through the walls of said chamber, to maintain said ore body at a temperature between about 650° C. and 800° C.; introducing a preheated hydrocarbon gas into contact with the ore in the lower portion of said body, to cause reduction of manganese in said ore within the body to a state of oxidation lower than $Mn_3O_4$ and partially to metallic manganese, and to cause deposition on the ore of carbon formed by decomposition of the hydrocarbon gas; removing from the lower end of the ore body partially reduced ore containing manganese completely reduced to a state of oxidation lower than $Mn_3O_4$ and partially reduced to metallic state and also containing carbon; subjecting the ore so removed, in a third stage, to further heating in the presence of a solid reducing agent including the carbon present in the ore, at a temperature sufficient to complete the reduction of the manganese to the metallic state and cause fusion thereof; and recovering the resulting metallic manganese.

6. A process for the recovery of manganese from an ore containing an oxide thereof higher than MnO, which comprises: passing the ore in divided condition in contact with hot combustion gases in a first stage in which the ore is free to expand on heating, to remove water present in the ore and heat the ore to a temperature between about 400° C. and about 900° C.; delivering the dried and heated ore from the first stage into an enclosed vertically extending chamber and maintaining a vertically extending body of such ore within said chamber for treatment in a second stage; supplying heat to said ore body through the walls of said chamber, to maintain said ore body at a temperature between about 400° C. and 900° C.; heating a hydrocarbon gas externally of said chamber to a temperature at least approximating the temperature of the ore in said heated zone; introducing said heated hydrocarbon gas into contact with the ore in the lower portion of said body, to cause partial reduction of manganese therein and produce gaseous reaction products; removing such gaseous reaction products from said chamber above the ore body; supplying additional preheated ore to the upper end of said ore body and removing ore containing partially reduced manganese from the lower end of the ore body at such a rate that the manganese in the ore reaching the lower end of the body is completely reduced to a state of oxidation lower than Mn₃O₄ and partially reduced to metallic manganese; removing the ore so treated from the lower end of the ore body; subjecting the ore so removed, in a third stage, to further heating in the presence of a solid reducing agent at a temperature sufficient to complete the reduction of the manganese to the metallic state and cause fusion thereof; and recovering the resulting metallic manganese.

7. A process for the recovery of manganese from an ore containing an oxide thereof higher than MnO, which comprises: passing the ore in divided condition in contact with hot combustion gases in a first stage in which the ore is free to expand on heating, to remove water present in the ore and heat the ore to a temperature between about 400° C. and about 900° C.; delivering the dried and heated ore from the first stage into an enclosed vertically extending chamber and maintaining a vertically extending body of such ore within said chamber for treatment in a second stage; supplying heat to said ore body through the walls of said chamber, to maintain said ore body at a temperature between about 400° C. and 900° C.; introducing a preheated hydrocarbon gas into contact with the ore in the lower portion of said body, to cause reduction of manganese in said ore within the body to a state of oxidation lower than Mn₃O₄ and partially to metallic manganese, and to produce gaseous reaction products containing combustible constituents; removing gaseous products including combustible constituents from said chamber above the ore body; burning said combustible constituents and utilizing the hot combustion gases so produced in the heating of the ore in the first stage; removing from the lower end of the ore body partially reduced ore containing manganese completely reduced to a state of oxidation lower than Mn₃O₄ and partially reduced to metallic state; subjecting the ore so removed, in a third stage, to further heating in the presence of a solid reducing agent at a temperature sufficient to complete the reduction of the manganese to the metallic state and cause fusion thereof; and recovering the resulting metallic manganese.

8. In a process for the recovery of manganese from an ore containing a higher oxide thereof, the steps that comprise: maintaining a vertically extending body of such an ore in divided condition within an enclosed chamber; supplying heat to said ore body through the walls of said chamber in a heated zone extending throughout a major portion of the height of said ore body, to maintain the ore at a temperature between about 400° C. and about 900° C. within said zone; and introducing a preheated hydrocarbon gas into contact with the ore at a plurality of positions intermediate the height of said heated zone, to cause reduction of manganese in said ore within the body to a state of oxidation lower than Mn₂O₄ and partially to metallic manganese.

9. In a process for the recovery of manganese from an ore containing a higher oxide thereof, the steps which comprise: maintaining a vertically extending body of such an ore in divided condition within an enclosed chamber; supplying heat to said ore body through the walls of said chamber in a heated zone extending throughout a major portion of the height of said ore body, to maintain the ore at a temperature between about 400° C. and about 900° C. within said zone; heating a hydrocarbon gas externally of said chamber to a temperature at least approximating the temperature of the ore in said heated zone; introducing said heated hydrocarbon gas into contact with the ore at a plurality of horizontally spaced positions intermediate the height of said heated zone, to cause partial reduction of manganese therein and produce gaseous reaction products; removing such gaseous reaction products from said chamber above the ore body; and supplying additional preheated ore to the upper end of said ore body and removing ore containing partially reduced manganese from the lower end of the ore body at such a rate that the manganese in the ore reaching the lower end of the body is completely reduced to a state of oxidation lower than Mn₃O₄ and partially reduced to metallic manganese.

10. In a process for the recovery of manganese from an ore containing a higher oxide thereof, the steps which comprise: maintaining a vertically extending body of such ore in divided condition within an enclosed chamber; supplying heat to said ore body through the walls of said chamber in a heated zone extending throughout a major portion of the height of said ore body, to maintain the ore at a temperature between about 650° C. and about 800° C. within said zone; heating a hydrocarbon gas externally of said chamber to a temperature at least approximating the temperature of the ore in said heated zone; introducing said heated hydrocarbon gas into contact with the ore at a plurality of positions intermediate the height of said heated zone, to cause partial reduction of manganese therein and produce gaseous reaction products; removing such gaseous reaction products from said chamber above the ore body; and supplying additional preheated ore to the upper end of said ore body and removing ore containing partially reduced manganese from the lower end of the ore body at such a rate that the manganese in the ore reaching the lower end of the body is completely reduced to a state of oxidation lower than $Mn_3O_4$ and partially reduced to metallic manganese.

11. In a process for the recovery of manganese from an ore containing a higher oxide thereof, the steps which comprise: maintaining a vertically extending body of such ore in divided condition within an enclosed chamber; supplying heat to said ore body through the walls of said chamber, to maintain the ore at a temperature between about 400° C. and about 900° C.; heating a hydrocarbon gas externally of said chamber to a temperature at least approximating the temperature of the ore in said heated zone; introducing said heated hydrocarbon gas into contact with the ore in the lower portion of said body, to cause partial reduction of manganese therein and produce gaseous reaction products; removing such gaseous reaction products from said chamber above the ore body; and supplying additional preheated ore to the upper end of said ore body and removing ore containing partially reduced manganese from the lower end of the ore body at such a rate that the manganese in the ore reaching the lower end of the body is completely reduced to a state of oxidation lower than $Mn_3O_4$ and partially reduced to metallic manganese.

12. In a process for the recovery of manganese from an ore containing a higher oxide thereof, the steps which comprise: maintaining a vertically extending body of such ore in divided condition within an enclosed chamber; supplying heat to said ore body through the walls of said chamber, to maintain the ore at a temperature between about 650° C. and about 800° C.; heating a hydrocarbon gas externally of said chamber to a temperature somewhat above the temperature of the ore in said heated zone; introducing said heated hydrocarbon gas into contact with the ore in the lower portion of said body, to cause partial reduction of manganese therein and produce gaseous reaction products; removing such gaseous reaction products from said chamber above the ore body; and supplying additional preheated ore to the upper end of said ore body and removing ore containing partially reduced manganese from the lower end of the ore body at such a rate that the manganese in the ore reaching the lower end of the body is completely reduced to a state of oxidation lower than $Mn_3O_4$ and partially reduced to metallic manganese.

ELFEGO RIVEROLL.